US012348383B1

United States Patent
Ouyang et al.

(10) Patent No.: US 12,348,383 B1
(45) Date of Patent: Jul. 1, 2025

(54) SYSTEM PERFORMANCE DEGRADATION DETECTION AND REMEDIATION UTILIZING DISCRETE INTER-MESSAGE TIMING CALCULATION AND MODELING INTER-MESSAGE-TIMING

(71) Applicant: Morgan Stanley Services Group Inc., New York, NY (US)

(72) Inventors: Yijin Ouyang, Alpharetta, GA (US); Jared Mroz, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/020,119

(22) Filed: Jan. 14, 2025

(51) Int. Cl.
H04L 41/147 (2022.01)
H04L 41/14 (2022.01)
H04L 41/16 (2022.01)

(52) U.S. Cl.
CPC .......... *H04L 41/147* (2013.01); *H04L 41/145* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 7,616,585 B1 | 11/2009 | Kritov et al. | |
| 10,244,581 B2 * | 3/2019 | Routt | H04L 41/0896 |
| 2017/0063705 A1 | 3/2017 | Gilson et al. | |
| 2017/0093705 A1 | 3/2017 | Gopalan et al. | |
| 2020/0195539 A1 | 6/2020 | Sivaraj et al. | |
| 2020/0267053 A1 | 8/2020 | Zheng et al. | |
| 2020/0358685 A1 | 11/2020 | Gupta et al. | |
| 2021/0392052 A1 * | 12/2021 | Soryal | G06Q 10/02 |
| 2022/0224776 A1 | 7/2022 | Doshi et al. | |
| 2022/0225411 A1 | 7/2022 | Axnäs et al. | |
| 2022/0255816 A1 | 8/2022 | Eriksson et al. | |
| 2022/0345417 A1 | 10/2022 | Kasichainula et al. | |
| 2022/0377005 A1 * | 11/2022 | Vasseur | H04L 41/147 |
| 2023/0010406 A1 | 1/2023 | Doshi et al. | |
| 2023/0027178 A1 | 1/2023 | Shah et al. | |
| 2023/0032578 A1 | 2/2023 | Kim et al. | |
| 2023/0145097 A1 | 5/2023 | Kiran et al. | |

(Continued)

*Primary Examiner* — Fadi Haj Said
(74) *Attorney, Agent, or Firm* — Leason Ellis LLP

(57) ABSTRACT

A method for reducing latency in communication over a network incudes obtaining historical data concerning communications including latency, inter-message timing, volume and number of sessions, converting the obtained data into feature parameters, including an inter-message timing metric, for use as inputs to a machine learning algorithm, training the machine learning algorithm using the feature parameters to predict communication latency. After training the network, providing new feature parameters including at least an inter-message timing metric and a number of sessions, concerning a current communication scenario, executing the trained machine learning algorithm to predict latency based on the new feature parameters, determining a predicted minimal latency for the current communication scenario by iteratively executing the machine learning algorithm while adjusting inter-message timing and session parameters, and setting the inter-message timing and session parameters current scenario at values which provide the predicted minimal round trip latency.

8 Claims, 12 Drawing Sheets

(56) References Cited

U.S. PATENT DOCUMENTS

| | | | |
|---|---|---|---|
| 2023/0188456 A1* | 6/2023 | Kolar | H04L 45/08 370/392 |
| 2023/0275843 A1 | 8/2023 | Al-Banna et al. | |
| 2023/0327971 A1* | 10/2023 | Kolar | H04L 43/12 709/224 |
| 2025/0048418 A1* | 2/2025 | Subramanya | H04L 41/342 |

* cited by examiner

FIG. 7

SYSTEM PERFORMANCE DEGRADATION DETECTION AND REMEDIATION UTILIZING DISCRETE INTER-MESSAGE TIMING CALCULATION AND MODELING INTER-MESSAGE-TIMING

FIELD OF THE DISCLOSURE

The present disclosure relates to electronic communication networks, and more particularly relates to a method of detecting and remediating system performance degradation through network latency prediction and optimization based on inter-message-timing.

BACKGROUND OF THE DISCLOSURE

Network latency is generally defined as the time it takes for data to travel across a network. Latency is typically measured in microseconds or milliseconds. Round trip latency (RTT) is one measure of latency, and it is the time it takes for a request to be sent and a response to be received in a round trip between a sender and receiver. The perception of RTT latency is impacted by the location within the network where the send and receive messages were observed. FIG. 1 shows a first graph of RTT latency versus time 105 for communications between an internal router and a an external commercial exchange over a yearly time period and a second graph of communication volume 110 over time between the same participants and time period. The upward sloping tendency of the latency graph 105 is clear. Average RTT latency in the later months of the period are nearly 90 µs.

While latency can be measured it is often difficult to pinpoint the causes of latency in a network. The level of latency within a network can therefore be difficult to predict accurately, particularly in overall low-latency network environments. One employed approach predicts network latency at specific timing. This approach uses a k-nearest neighbor (KNN) algorithm and focuses on a system's overall architecture and process flow. However, KNN algorithms can lack technical granularity and require extensive distance calculations among data points, resulting in high computation overhead and making this approach impractical for large-scale applications in real-time.

What is therefore needed is a more precise method for predicting message latency and diagnosing causes of latency fluctuation.

SUMMARY OF THE DISCLOSURE

According to one aspect, the present disclosure describes a computer-implemented method for predicting latency in communication over a network. The method, implemented using one or more processors comprises obtaining historical data concerning network communications including latency, volume and a number of active sessions, converting the obtained data into feature parameters for use as inputs to a machine learning algorithm, wherein the feature parameters include an inter-message timing metric, training the machine learning algorithm using the feature parameters to predict latency of communications of the network, after training the model, providing new feature parameters concerning a current communication scenario, the new feature parameters including at least an inter-message-timing range and a number of sessions, and executing the trained machine learning algorithm to predict latency based on the new feature parameters.

In another aspect, the present disclosure describes a computer-implemented method for reducing latency in communication over a network. The method, implemented using one or more processors comprises obtaining historical data concerning network communications including latency, inter-message timing, volume and number of sessions, converting the obtained data into feature parameters for use as inputs to a machine learning algorithm, wherein the feature parameters include an inter-message timing metric, training the machine learning algorithm using the feature parameters to predict round trip latency of communications of the network, after training the network, providing new feature parameters concerning a current communication scenario, the new feature parameters including at least a inter-message timing range and a number of sessions, executing the trained machine learning algorithm to predict round trip latency based on the new feature parameters, determining a predicted minimal round trip latency for the current communication scenario by iteratively executing the machine learning algorithm while adjusting inter-message timing and session parameters, and setting the inter-message timing and session parameters for the current communication scenario at values which provide the predicted minimal round trip latency.

In still another aspect, the present disclosure describes a computer-implemented system for reducing latency in communication over a network. The system includes a data communication network comprising a plurality of senders and receivers which send messages on a hop-by-hop basis, a database coupled to the data communication network configured to record and store messages occurring in the data communication network and message metadata associated with the messages; and a dynamic session manager executed by one or more processors. The dynamic session manager is configured to obtain data concerning current communications in the data communication network including latency, volume and a number of active sessions, execute a simulation using a machine learning algorithm trained using historical data communication data to forecast a current latency jn the data communication network; determine if the current latency is optimal, and to adjust parameters including a number of current communication sessions to improve latency when it is determined that the current latency is not optimal.

BRIEF DESCRIPTION OF THE DRAWINGS

FIG. 7 is a table showing examples of engineered features according to an embodiment of the present disclosure.

DESCRIPTION OF CERTAIN EMBODIMENTS OF THE DISCLOSURE

The present disclosure describes a method and system that inter-message timing as a key metric to identify performance degradation and predict the latency of communication on network hops based on machine learning regression model being trained using the key metric. A dynamic session manager can be further used to estimate latency performance, factoring in the effect of session configuration changes to inter-message timing. A statistical profile on inter-message timing intervals provides detailed insights on network performance on a flow level based on latency. Such insights are useful in diagnosing session utilization problems and in identifying session configurations that best allocate resources to achieve optimized latency at each inter-message-timing level.

The disclosed method and system provide a more precise tool for both predicting the latency of individual communications and diagnosing the causes of latency fluctuation. The use of inter-message-timing as a primary predictor for latency has proven effective in making accurate predictions, provides granularity, and serves as a standard metric. These features of inter-message-timing provide the ability to safely experiment and test configurations through simulation.

Figure 1:
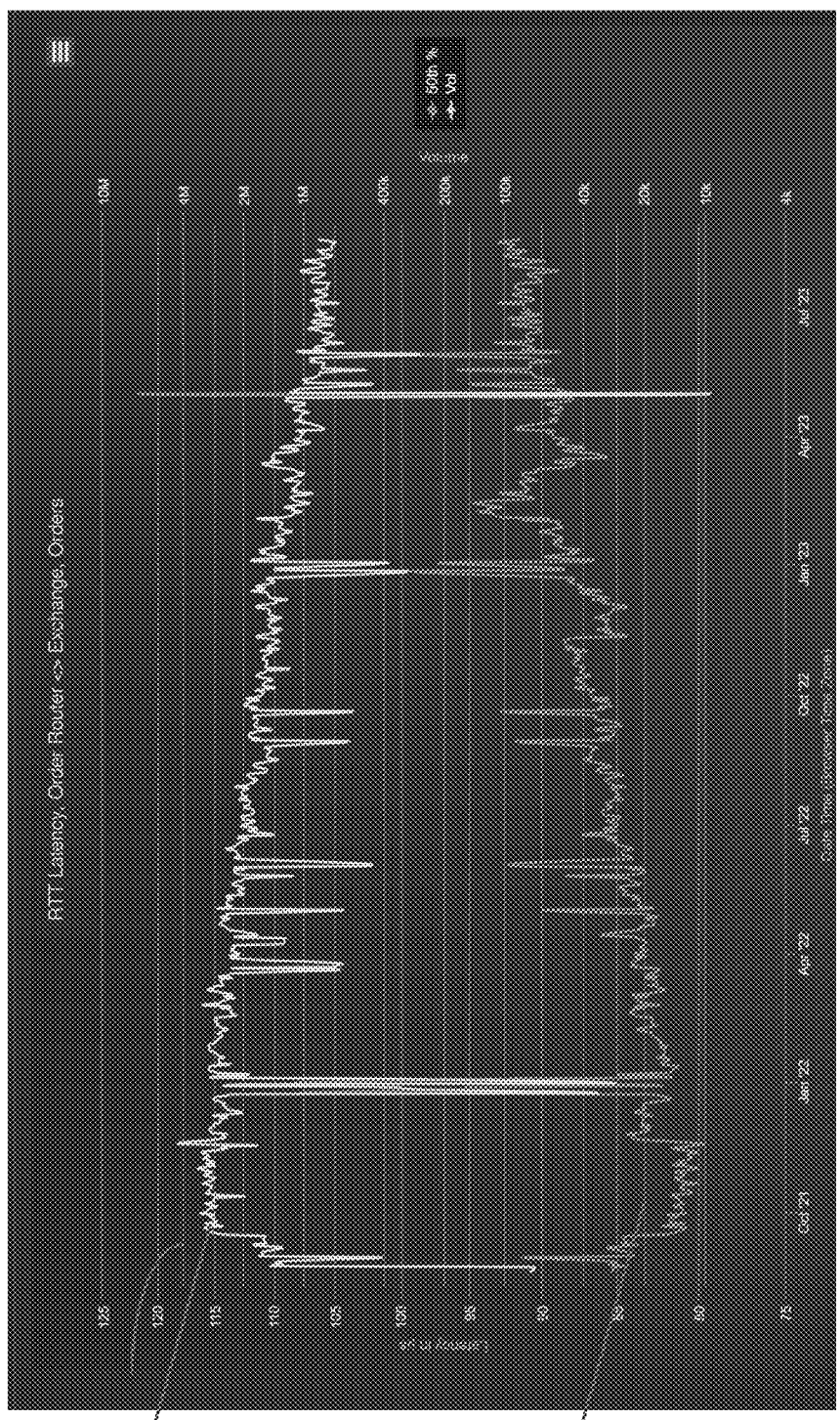
FIG. 1 shows graphs of RTT latency versus time and volume for communications between an internal routers and exchanges over a yearly time period before experimentation.
Figure 2:
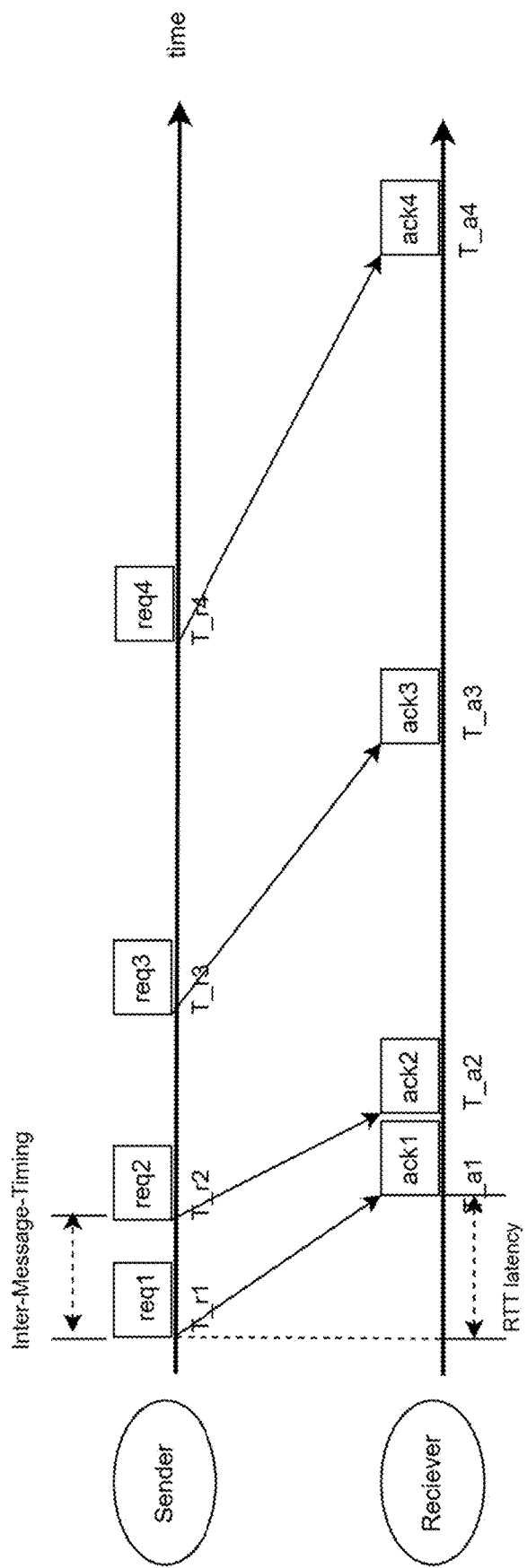
FIG. 2 is an exemplary timeline of requests and acknowledgement on network hops sent within a network which illustrates the concept of inter-message-timing.

FIG. 2 is an exemplary timeline of a communication between a sender and a receiver (two network hops), in which the sender transmits requests and the receiver returns acknowledgments in response to the requests by the sender. Requests are shown on first time axis on top, and acknowledgments are shown on a second time axis on the bottom. As shown, the sender sends a first request req1 and time T_r1. of requests from a sender and acknowledgements by a receiver. The receives req1 and transmits and acknowledgment ack1 in response at time T_a1. The interval between T_r1 and T_a1 is the RTT latency, which is a specific measurement of inter-message timing. FIG. 2 also shows additional requests req2, req3, req4 issued by the sender and corresponding acknowledgments ack2, ack3 and ack4 issued by the receiver. As can be discerned, the RTT latency varies for each of the corresponding pairs req2/ack2, req3/ack3 and req4/ack4. Inter-message-timing is thus observed at the message level and reflects real-time network status and congestion levels. It is a standard unit of measurement which provides precise insights into timing dynamics. By contrast, traffic data represents an aggregated view comprising numerous messages and lack granularity. Additionally, traffic is typically measured across different facilities, activities and condition, making it a more volatile metric.

Figure 3:
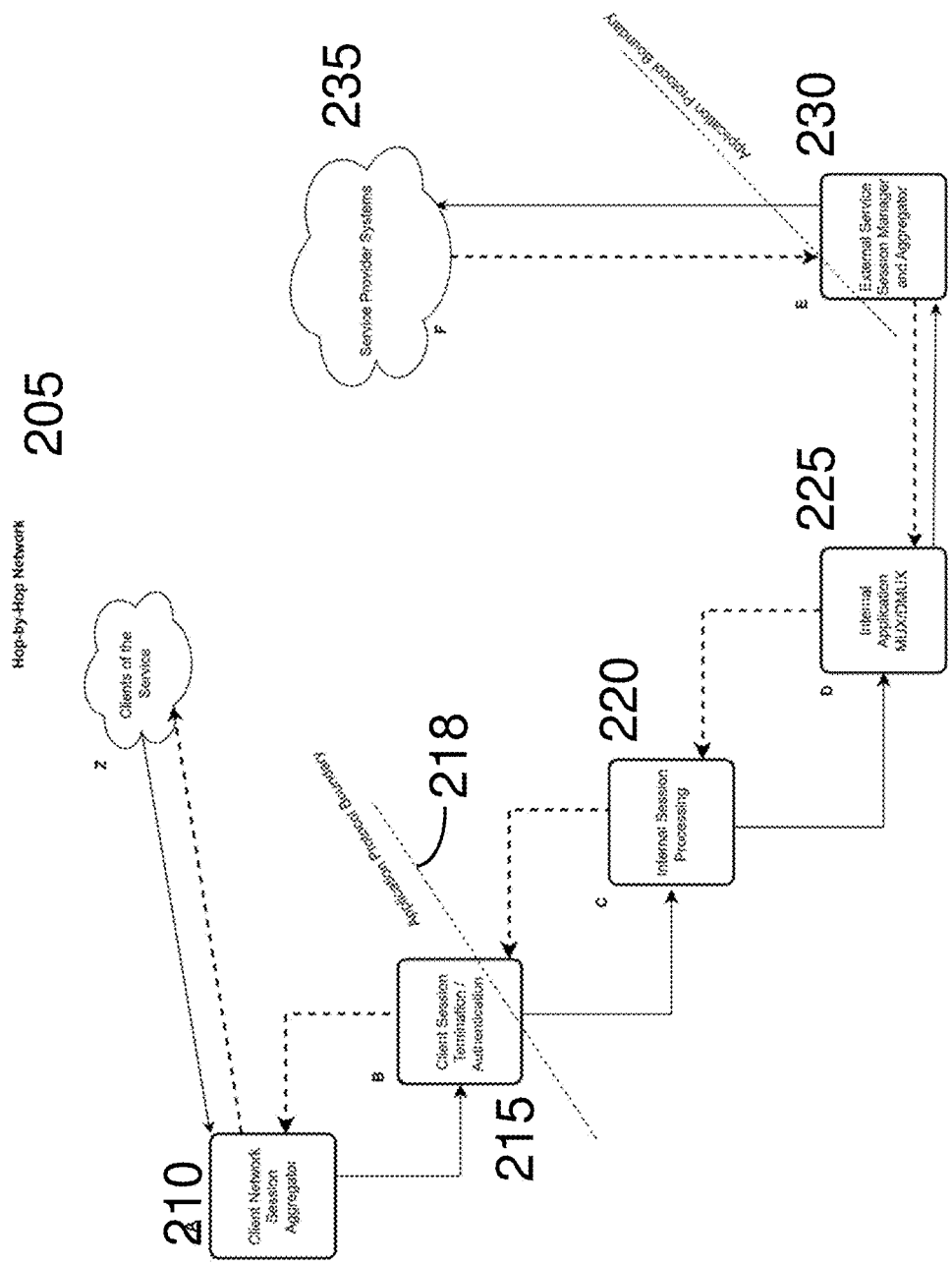
FIG. 3 is a schematic diagram that illustrates exemplary network hops in a communication session of an enterprise service.

FIG. 3 is a schematic diagram that illustrates exemplary network hops in a communication session of an enterprise service. The diagram illustrates the network hops which occur internally as an internal client 205 attempts to access an external service provider system 235. RTT latency occurs through each of the request and acknowledgments that are generated through each hop shown.

Clients of the service 205 are third-party consumers of a service created using the technology platform hosted by the enterprise. Network session connectivity is initially established from the clients using the TCP protocol. Initial communication is established between the clients 205 and a client network session aggregator 210 ("session aggregator"). The session aggregator can be a network device or application which collects and aggregates the client TCP sessions before transmission for session authentication. The session aggregator 210 may utilize NAT (network address translation), direct pass-through, or session proxy as examples of methods for aggregation. The session aggregator communicates messages to a client session termination device or application 215 ("session terminator"), which is responsible for application/service authentication and authorization of the client sessions. The TCP sessions which are originated at the client and aggregated by the session aggregator 210 are terminated at this point. The session terminator 215 may initiate a new session with additional internal systems and may utilize a new protocol such as UDP to do so. This behavior is noted by an application protocol boundary 218.

The session terminator 215 sends authorized sessions and network communications to an internal session processing application or device 220 ("internal session processor"). The internal session processor 220 is configured to process the data contained in the message traffic received from the session terminator 215 to determine which application/service is to be utilized. Additional processing performed by the internal session processor 220 includes validation of various parameters (e.g., risk or limits if a financial services application.) After processing, the internal session processor 220 transmits processed data via established network connectivity sessions.

An internal application multiplexer/demultiplexer (MUX/DMUX) 225 receives multiple communication sessions from the internal session processor 220 that are related to a particular provided service and aggregates (multiplexes) the sessions into a single common service session. The common service session is then transmitted to an external service manager and aggregator 230. The internal application MUX/DMUX 225 also receives data transmitted back from the external service manager on the aggregated sessions and redistributes (demultiplexes) the session back into the specific, individual sessions. The individual sessions are then transmitted back to the internal session processor 220.

The external service manager and aggregator ("ESMA") 230 is a device, combination of devices, application or combination of applications running on one or more devices which manages and maintain network sessions (typically TCP) with externally hosted service provider systems 235. The external service provider systems are network/application services that the service clients 205 are attempting to utilize through the internal network and application hops.

The ESMA 230 performs session termination from the internal application MUX/DMUX 225 and transfers processed data to the external service provider(s) on their specific sessions. A protocol transformation and data modification can occur at the interface between the ESMA 230 and the eternally hosted service providers systems. For example, the protocol transformation can be performed to match the transmission requirements of the externally hosted service providers.

Figure 4:
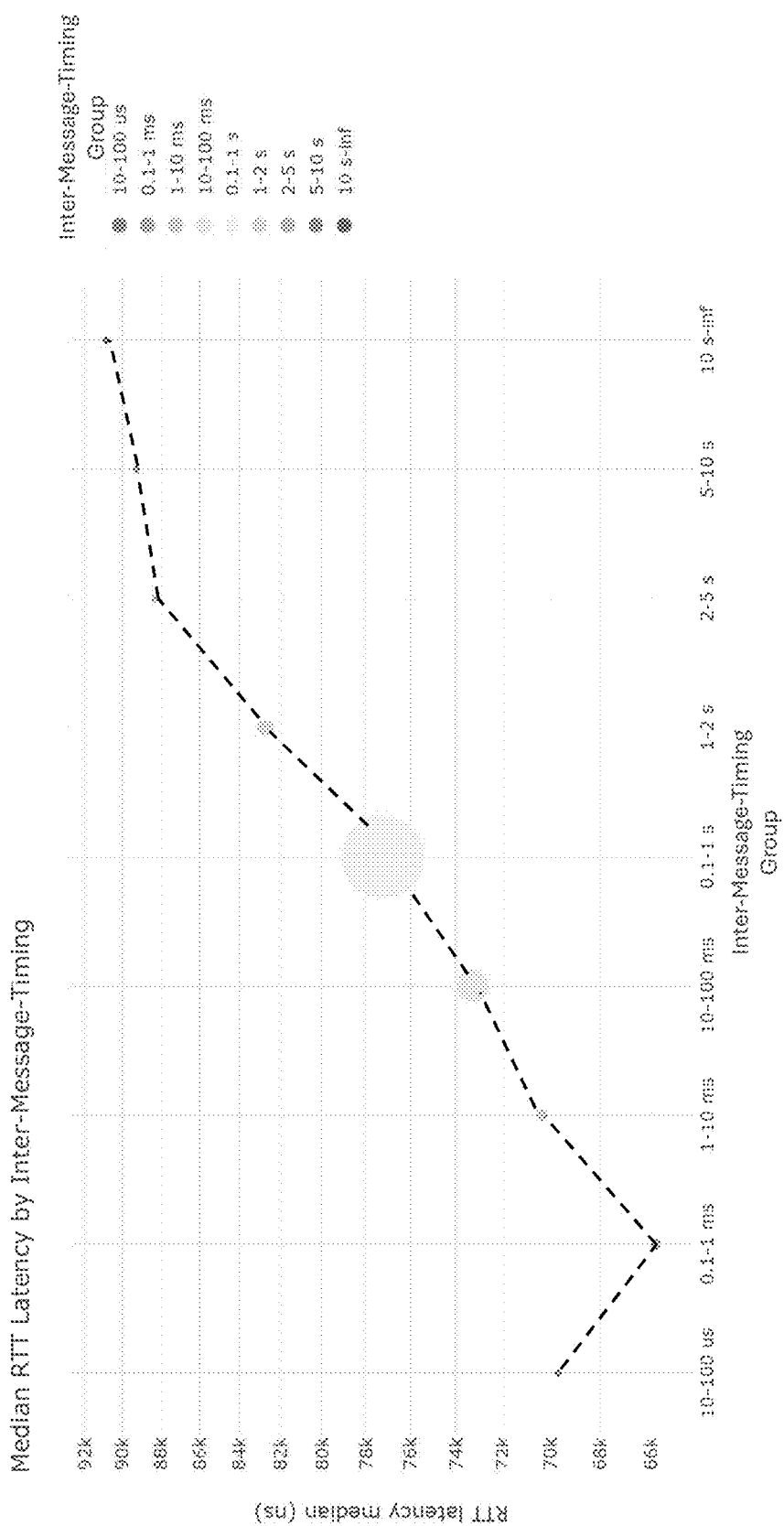
FIG. 4 is a graph of RTT latency at $50^{th}$ percentile as measured in nanoseconds versus inter-message-timing.

Latency occurs in each of the network hops shown in FIG. 3. FIG. 4 is a graph of RTT latency at $50^{th}$ percentile as measured and calculated in nanoseconds versus inter-message timing. As the graph shows, at inter-message-timing intervals in the range of 10-100 μs, RTT latency is approximately 70 k ns. When the inter-message-timing intervals are in the range of 0.1 to 1 ms (100-1000 μs), the RTT latency falls to a level of approximately of 66 k ns. As the inter-message-timing interval increases beyond 1 ms, the RTT latency increases monotonically. The 0.1 to 1 ms range is therefore optimal for RTT latency. At the lowest interval of 10-100 μs as the messages are paced overly rapidly which it is inferred can be from a queuing effect. At higher inter-message-timing ranges higher 1 ms, which it is considered may be due to inadequate cache warming, resulting in higher RTT latencies.

Figure 5:
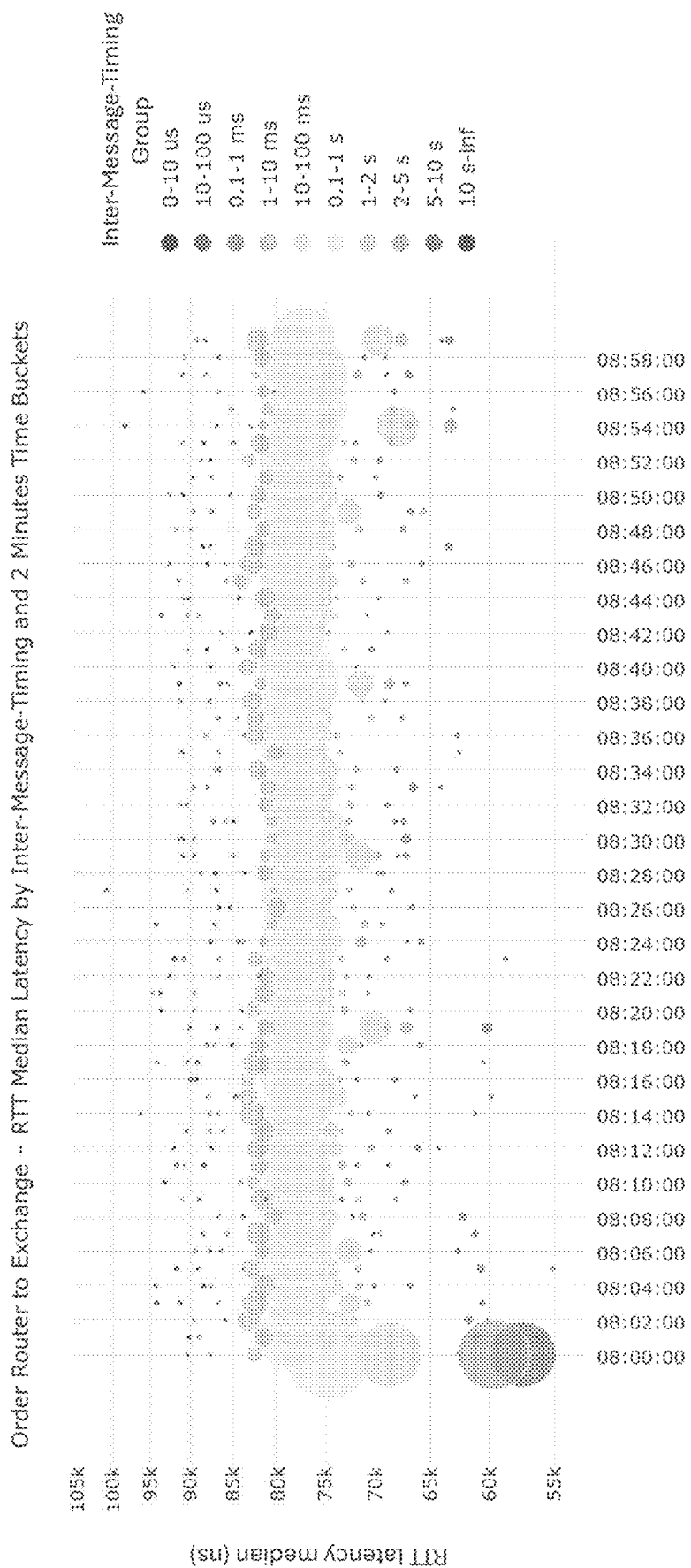
FIG. 5 is a graph of RTT latency at $50^{th}$ percentile over a communication session (time) for various inter-message-timing intervals by two minutes time buckets.

FIG. 5 is a graph of RTT latency over a communication session (time) for various inter-message-timing intervals. As shown, the 0.1 to 1 ms interval range has the lowest median RTT latency with RTT being potentially reduced by approximately 20 μs through order request session rebalancing alone. The data shown further indicates underutilization of communications sessions due to slow inter-message-timing. To improve utilization, the method of the present disclosure aims to concentrate flow of messages with reduced session connectivity.

While the data shown in FIGS. 4-5 provide some guidance as to ranges of inter-message timing that generally optimize latency, due to communication volumes and other factors, the data shown cannot be used to predict latency for a particular communication session with a particular entity (e.g., trading platform or exchange).

Figure 6:
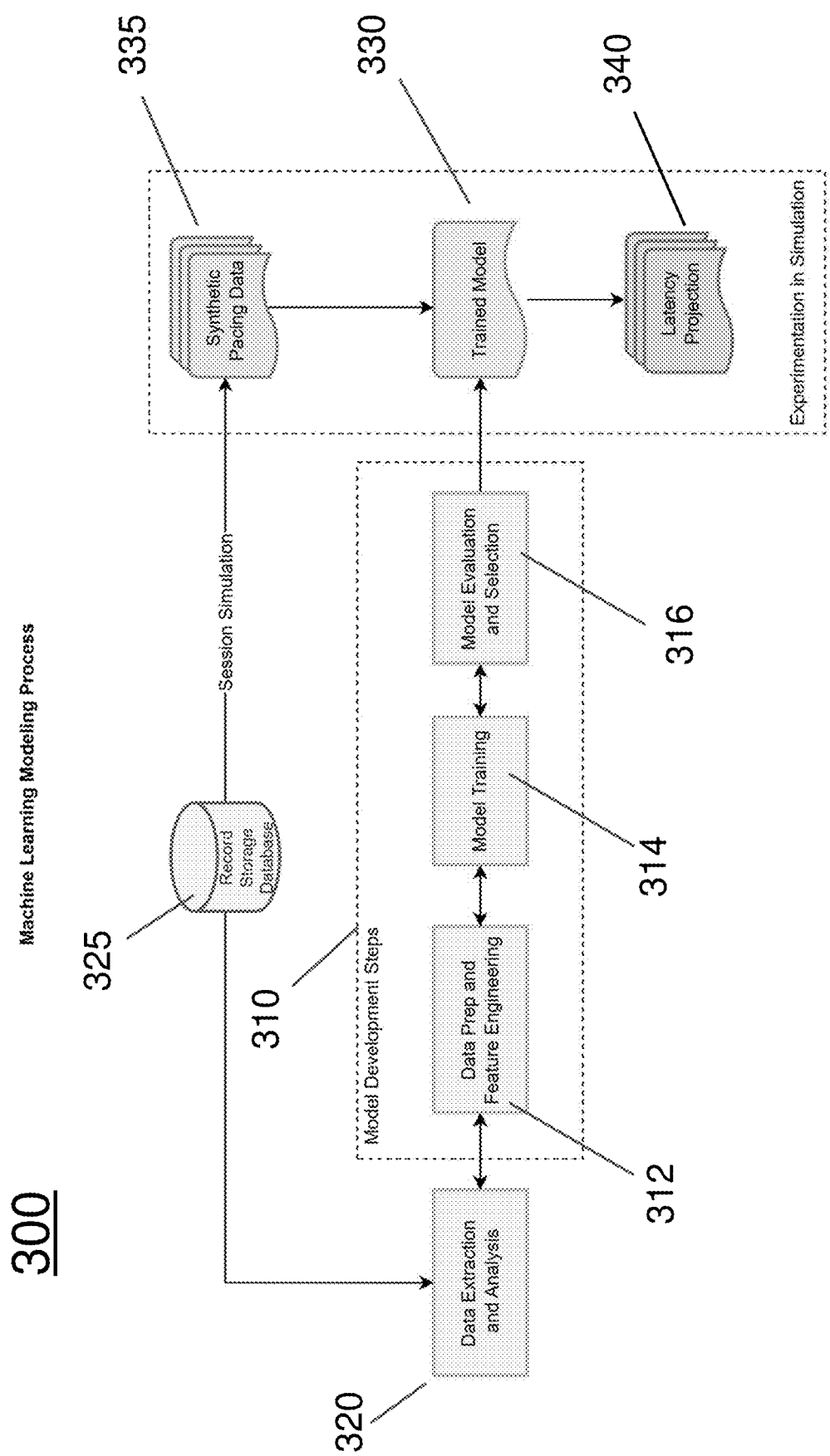
FIG. 6 is a flow diagram of a method of using machine learning to predict latency according to an embodiment of the present disclosure.

FIG. 6 is a flow diagram of a method of using machine learning to predict latency according to an embodiment of the present disclosure. In the initial part of the flow, a number of model development steps 310 are performed. The development steps 310 include data preparation and feature engineering 312, model evaluation and selection 314 and model training 316. Although the model training process 314 in FIG. 6 sits between data preparation and feature engineering 314 it is because it is uses as inputs both the data and selected model rather than comes between them temporally.

Figure 7:
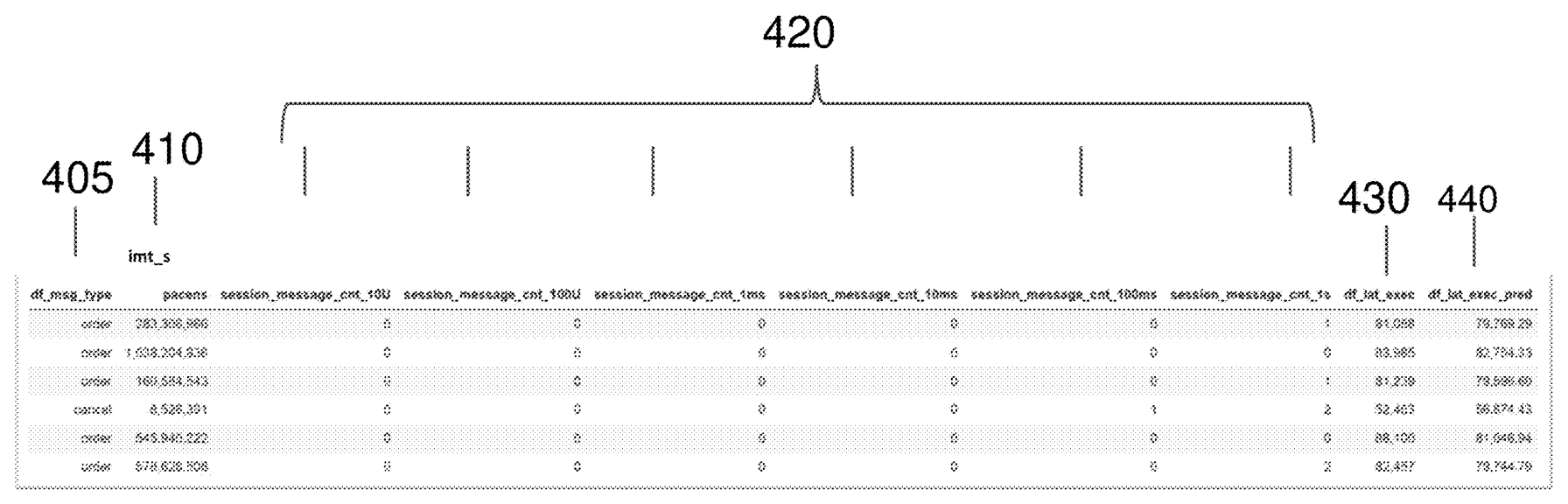

The data preparation process utilizes data that is first extracted 320 from a database 325 that stores historical (offline) communication data including order (request) execution, network hop inter-message timing and latency information. The extraction process 320 filters the database for pertinent data. Feature engineering is part of data preparation and is the process of selecting, manipulating and transforming raw data into features or parameters that can be used to train a machine learning model. A "feature" is thus any measurable parameter that can be input to a machine learning model. The feature can be "engineered" in that it may not initially appear as a defined measurement in the original data in database 320 but can be derived from various original data. An example of engineered features/parameters is shown in FIG. 7. The features include a message type 405 (e.g., order, cancel), an inter-message-timing feature 410, several features which count session messages at specific inter-message-timing intervals (collectively 420) including 10 μs, 100 μs, 1 ms, 10 ms, 100 ms and 1 second. The last engineered input feature is the measured latency 430 during execution of the messages. A predicted latency 440 as determined by the model is also included. In the example data shown in FIG. 7, there are no counts at inter-message-timing below 100 ms (for a cancel order) and multiple counts at 1 second.

Model selection and evaluation concerns selecting the type of machine learning model(s) (algorithm) to apply to the prepared features, the hyperparameters to use for use models, and the optional use of additional boosting and ensemble execution. A machine learning (ML) model, particularly a supervised model, is a model that is trained to perform a specific application or task on a specific type of input samples. Typical examples of such tasks are classification and prediction. The particular type of the ML model and can vary. For example, an ML model can comprise one or more the deep learning models, neural network models, deep neural network models (DNNs), convolutional neural network models (CNNs), decision tree models, SVM models, regression analysis models, Bayesian network models, heuristic models, and other types of algorithms.

Each ML model is generally associated with a set of hyperparameters which are the specific parameters defined by the user to control the learning process. These parameters can include the number of layers in a deep learning network, the learning rate, the number of epochs for training, and the number of branches in a decision-tree algorithm. The hyperparameters for selecting a machine learning algorithm can also directly affect the model training phase. For example, the batch size and percentage split between training and test data sets can be considered as hyperparameters. The hyperparameters can be modified based on evaluation of ML models upon review after execution. ML models with different hyperparameters and other characteristics can be executed together in an ensemble framework, which is a collection of ML models that work together to make classifications or predictions. Boosting algorithms can also be used Can be used in the ensemble context by converting multiple "weak learners" that have poor prediction accuracy into a single strong learning model.

Referring again to FIG. 6, the ML model(s) are trained 314 based on pertinent data, in the present case based on the communication data extracted 320 from database 325. More specifically, ML model(s) are trained to predict round trip latency (RTT) based on the input parameters including order volume, number of sessions, and inter-message-timing data (see FIG. 7). Once one or more ML models have been trained to predict latency to a sufficient degree of accuracy (e.g., within some set percentage variance from actual latency performance results), the ML model is considered to be a trained model 330. Additionally, once the soundness of the model has been assessed positively, the trained model 330 can then be used to make predictions on synthetic data 335. The synthetic data 335 can be used to test various inter-message-timing intervals set by an analyst. Execution of the trained model using the synthetic data yields latency predictions corresponding to the synthetic data. Referring again to FIG. 6, the predicted latencies 340 are the outputs of the trained ML model based on the rows of input data shown.

Figures 8A, 8B:
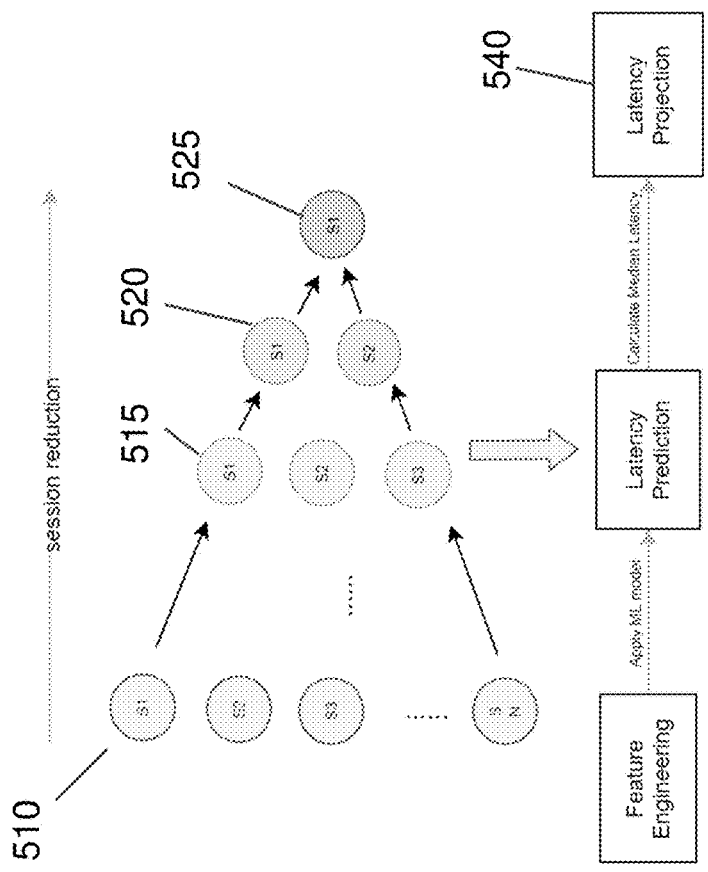
FIG. 8A is a flow chart of an exemplary method for simulating inter-message timing data to reflect network configuration changes and to estimate latency outcomes from session reduction in batch predictions. according to the present disclosure.
FIG. 8B is an exemplary graph of actual RTT latencies versus number of sessions taken from actual performance data and of projected median RTT latencies versus number of sessions obtained based on the simulation that uses the trained ML model on synthetic data.

FIG. 8A is a schematic illustration of simulation steps used in testing latencies for synthetic data while varying the number of sessions used. Input data for the simulation comprises a total number of M request messages with the timestamp on the sender side, and with the session identified by a pair of source and destination IP addresses. In a particular simulation, it is assumed that all communications (orders, requests) are sent at the original time, total message volume stays at a constant (M) level, and communication flow distribution among sessions is made uniform. As shown, simulations of communications are performed with various numbers of sessions being reduced iteratively. An initial simulation 510 is conducted over a set number of sessions (N), which yields an initial latency prediction. This is followed by N−1, N−2, etc. session until the simulation is conducted over 3 sessions 515, followed by two sessions 520 and then one session 525. The outcomes for the latency predictions for the various numbers of sessions are aggregated to determine a median latency projection 530. It is noted that in other embodiments, the number of sessions can be increases incrementally rather than decreased. In this alternative case, the diagram showing the number of sessions would be reversed in orientation.

FIG. 8B shows a first graph 550 of actual RTT latencies versus number of sessions taken from actual performance data and a second graph 460 of projected median RTT latencies versus number of sessions obtained based on the simulation that uses the trained ML model on synthetic data. It is noted that x-axis showing the number of sessions decreases from the origin. As shown the simulation shows a monotonic decrease of median RTT latency as the number of sessions also decreases. The results in the production environment match well with the simulation values, validating the accuracy of the model predictions.

Figure 9:
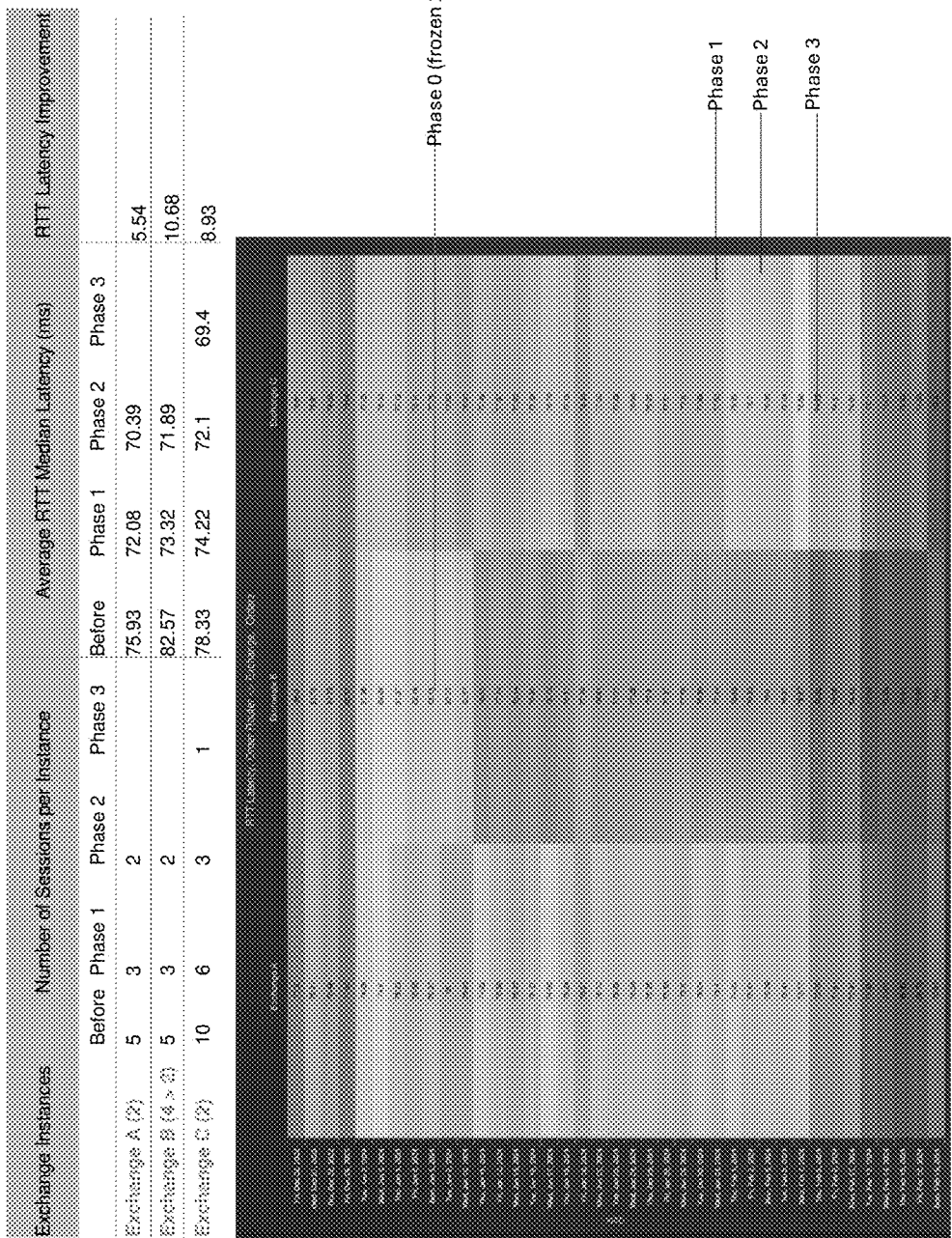
FIG. 9 provides tabular information concerning experiments performed in the production environment to test improvements in RTT latency by reducing the number of sessions.

FIG. 9 provides tabular information concerning experiments performed in the production environment to test improvements in RTT latency by reducing the number of sessions. The experiment is based on the use of inter-message-timing as a metric which provides the granularity necessary to accurately assess the improvement in RTT through session reduction. In the experiment, order communications between a primary communication exchange and three other exchanges was conducted using different numbers of communication sessions as deployed in three different phases. The phases occurred over several weeks in early 2024. In phase zero, the primary exchange conducted 10 sessions with a first counterparty exchange, 5 sessions with a second counterparty exchange and 5 sessions with a third counterparty exchange; In subsequent phases, the number of individual sessions conducted was reduced: in phase the respective numbers of sessions for the three counterparties was 6, 3 and 3; in phase 2, the respective numbers of sessions for the three counterparties was 3, 2 and 2; while in the final phase there was only a single session between the primary exchange and the first counterparty exchange (the experiment was not performed in phase three with the second and third counterparty exchanges).

The measurements made of RTT demonstrate that reducing the number of sessions also reduces order/request round trip latency. In phase zero, the RTT latencies between the primary exchange and the first, second and third counterparty exchanges are 78.33, 75.93 and 82.57, respectively. In phase 1, the respective RTT latencies drop to 74.22, 72.08, and 73.32, while in phase 2, the RTT latencies fall further to 72.1, 70.39 and 71.89. In phase 3, the RTT latency between the primary exchange and the first counterparty exchange is 69.4. The last column of the table shown in FIG. 8 shows the net changes in latencies from phase zero to phase 3 between the primary exchange and the first, second and third counterparty exchanges, which is 8.93, 5.54 and 10.68, respectively. The latency values represent a greater than 10% improvement from phase zero to phase three for communications between the primary exchange and the first and third counterparty exchanges. This can be considered to be largely the effect of reducing the number of distinct communication sessions open during messaging. In other words, latency is improved by concentrating the flow of messages among fewer sessions.

Figure 10A:
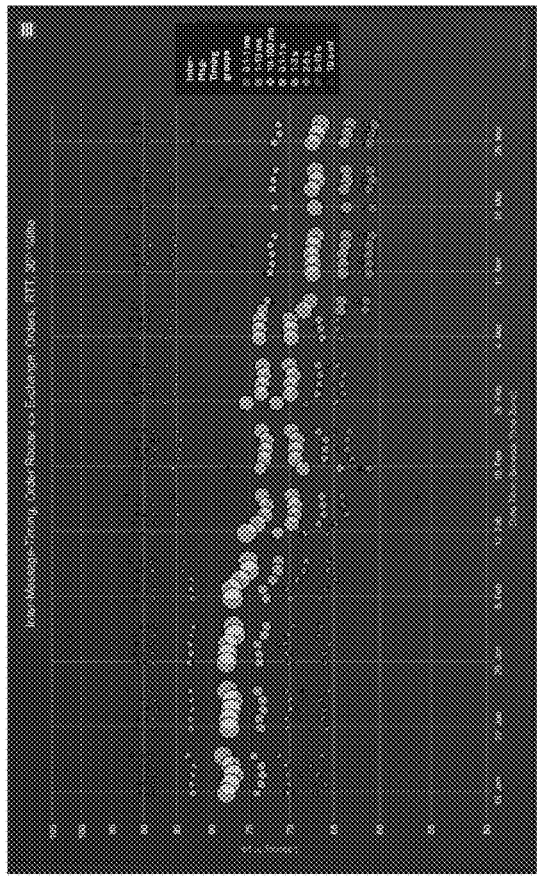
FIG. 10A is a graph showing RTT latencies among several inter-message-timing groups over time for the experiments conducted among the communication session.
Figure 10B:
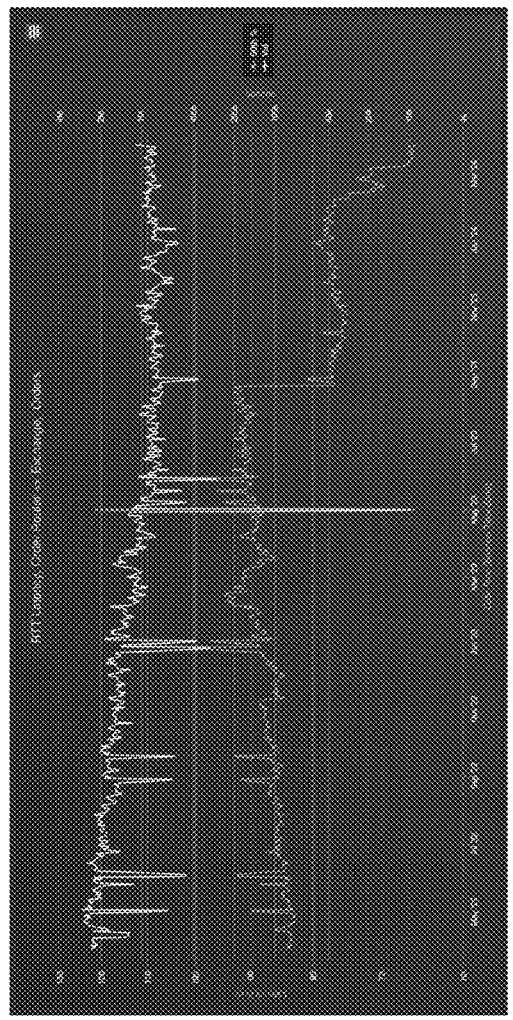
FIG. 10B shows graphs of median latency and volume by date before and after experimentation.

FIG. 10A is a graph showing RTT latencies among several groups of routers and exchanges over time for the experiments conducted among the communication exchanges. As shown, as the date increases and the number of sessions decreases (per FIG. 8) there is still a difference in latencies dictated by the inter-message-timing. The 0.1 to 1 ms range is again shown to be the optimal range for reducing latency. FIG. 9B shows graphs of median latency and volume by date. Latency and order volume shows no correlation in the experiments while latency is optimized through faster inter-message-timing with concentrated flow.

Based on the findings obtained by simulation, during communication, parameters can be adjusted to achieve minimal RTT latency by setting the number of sessions and inter-message-timing in accordance with predictions. The settings can be adjusted automatically in connection with execution of the machine learning algorithm in real time.

Figure 11:
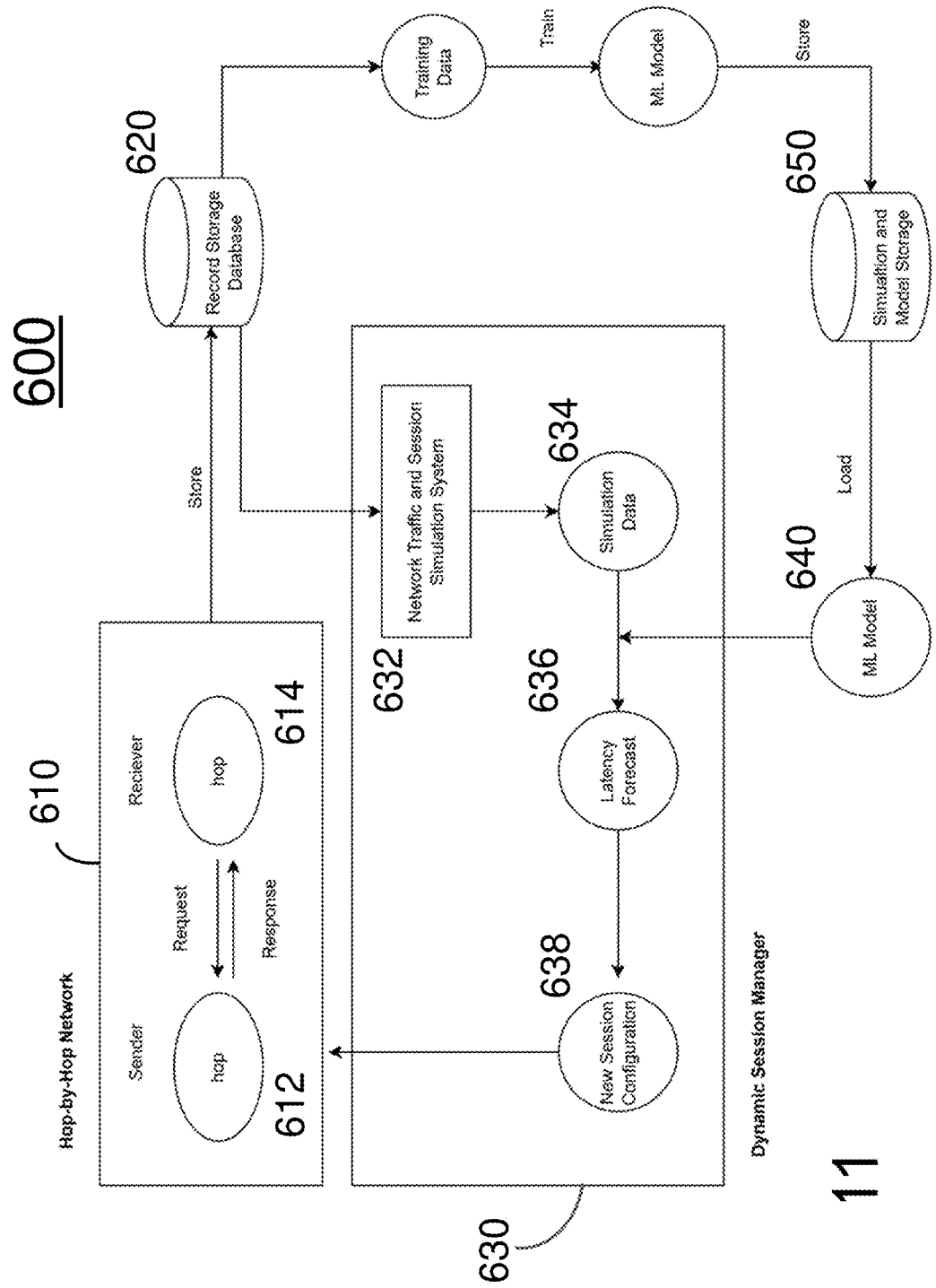
FIG. 11 is a system for network traffic and inter-message timing simulation according to an embodiment of the present disclosure.

FIG. 11 is a system for network traffic and inter-message timing simulation according to an embodiment of the present disclosure. The system 600 receives and processes traffic information between two network hops, uses records among sessions from a period as original data, and simulates new session datasets and inter-message-timing data by reducing (or increasing) the number of active sessions while redistributing messages. The system 600 further recalculates inter-message timing, predicting latency using a trained model, and projecting session-wise latency.

A network traffic and inter-message timing simulation system looks at traffic information between two network hops, use real records among sessions from a period as original data, simulates new session datasets and inter-message-timing data by reducing number of active sessions while redistributing messages, recalculating inter-message-timing, predicting latency using a trained model, and projecting session-wise latency. Messages transmitted in the hop-by-hop network 610 are recorded and stored in a database coupled to the network 610.

The simulation system 600 is orchestrated by a dynamic session manager 630 which is coupled to the hop-by-hop network and to the record storage database 620. Database 620 is preferably a fully-searchable cloud database (e.g., using SQL) that is coupled to the hop-by hope network 610 and is configured with process logic for ingesting, correlating and normalizing decoded messages from packet capture appliances on the network. The database 620 provides post-event investigation and proactive performance modeling by allowing the user to query any combination of criteria such as hop-by-hop, statistically relevant latency and performance metrics across all components of the infrastructure as well as performance metrics categorized by client and by application.

The dynamic session manager 630 is a system process that collects messages between network hops in the network 610 from database 620. The session manager includes a network traffic and session simulation system 632 which is coupled to the machine learning system described above with respect to FIG. 6. The traffic and session simulation system 632 is configured to produce simulation data 634 based on network hop data stored in the data base. The dynamic session manager 630 initiates a process to activate the trained machine learning model 640 to process the simulation data 634. The machine learning model processes the simulation data 634 to output a latency forecast 636 which is returned to the dynamic session manager 630. The dynamic session manager 630 is configured to compare the latency forecast 636 with the latency performance of actual, real-time messages at different session counts (received from database 620). The dynamic session manager incudes a session configuration process 638 through which the concurrent session count can be adjusted to match an optimal latency forecast.

The machine learning model 640 is one of any number of algorithms stored on a centralized model management tool 650. The model management tool 650 can incorporate functionality of a database, Object Storage System, model management platform and containerized storage. The model management tool can store machine learning models as binary large objects or encoded files. Algorithm metadata (e.g., flow identifiers, versions, hyperparameters, performance metrics) are also stored in the model management tool for tracking and searching purposes.

Figure 12:
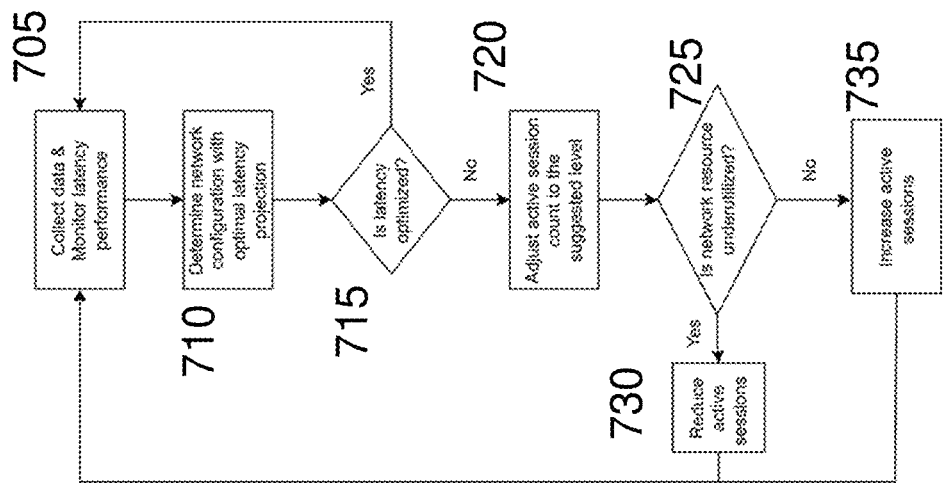
FIG. 12 is a flow chart of a method of optimizing latency a hop-to-hop network according to an embodiment of the present disclosure.

The session simulation process performed by the system machine learning model 640 on the simulation data 634 utilizes a number of different parameters as follows:

m: Total number of messages
n: initial number of sessions
N: Number of active sessions in a simulation step (N decreases from n to 1)
$T_i$: Timestamp of message i in the original dataset
$S_i$: Session ID associated with message i
$\Delta T_p$: inter-message-timing recalculated during the simulation for a given session
$L_i$: Latency (i.e., RTT or One-way) for a message
$L_{ip}$: Predicted latency for a message based on a trained machine learning model
Median(Lp): Median predicted latency for N active sessions at a simulation step FIG. 12 is a flow chart of a method of optimizing latency a hop-to-hop network according to an embodiment of the present disclosure. In a first initialization step 705, the dynamic session manager 630 pulls a dataset from database 620 that contains message (network hop) data. The data for each message includes an original session identifier (session ID), a sending-point time stamp, and original latency (e.g., RTT, one-way) as calculated from the database pipeline. In a following step 710, the dynamic system manager 630 determines the network configuration which will produce an optimal latency projection using a trained machine learning model 640. In step 715, the dynamic session manager 715 determines whether the current configuration optimizes the network latency. If it is determine in step 715 that latency is optimized, then the method process cycles back to step 705 for collection of additional datasets. If, conversely, it is determined in step 715 that latency is not optimized, then in step 720, the dynamic session manger 720 adjusts the configuration, and in particular, the session count (N) to a suggested level to reduce network latency.

The reconfiguration of step 720 can be implemented by iteratively reducing the number of active sessions N, where N decreases from the current session count n to 1. For each simulation step with N active sessions, the dynamic session manager 630 redistributes m messages among the N sessions, maintaining a uniform distribution of message count.

When it is determined that latency has not been optimized, the determination in step 710 includes the process of recalculating inter-message-timing. This involves, for each active session, sorting message by their original timestep ($T_i$), an calculating new inter-message timing for each message: For each message i:

$$\Delta T_p = T_i - T_i$$

Latency is predicted by applying the trained machine learning model 640 to each message i to predict Latency $L_{ip}$ using $\Delta T_p$ as well as other relevant features derived from dataset. The dynamic system manager further computes a latency projection as the median predicted RTT latency for messages across all active sessions in the current step:

$$\text{Median}(Lp) = \text{median}\{Lp\}_{i \in Session}$$

For each simulation, the following metrics are output: the number of sessions N (from n to 1), the number of redistributed messages among N sessions, and the projected RTT latency: Median(Lp) for all redistributed messages across N sessions.

Once latency has been optimized by adjusting the number of active sessions to the level suggested by the simulation, the dynamic session manager 630 assess whether network resources are being underutilized in step 725. It is determined that network resources are being underutilized, the dynamic session manager 630 reduces the number of active sessions in step 730. Otherwise, if network resources are not being underutilized, the dynamic session manager 630 increases the number of active sessions in step 735. After both steps 730 and 735, the method cycles back to step 705 for continuous optimization.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization sing data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method for reducing latency in communication over a network, the method, implemented using one or more processors comprising:
    obtaining historical data concerning network communications including latency, volume and a number of active sessions;
    converting the obtained data into feature parameters for use as inputs to a machine learning algorithm, wherein the feature parameters include an inter-message timing metric;
        training the machine learning algorithm using the feature parameters to predict latency of communications of the network;
    after training the model, providing new feature parameters concerning a current communication scenario, the new feature parameters including at least an inter-message-timing range and a number of sessions;
    executing the trained machine learning algorithm to predict latency based on the new feature parameters;
    determining a predicted minimal round trip latency for the current communication scenario; and
    updating the inter-message timing range and session parameters for the current communication scenario based on the predicted minimal round trip latency.

2. The method of claim 1, wherein the inter-message timing metric comprises a plurality of inter-message timing ranges.

3. The method of claim 1, further comprising:
    running a simulation by executing the machine learning algorithm using synthetic data corresponding to a posited communication scenario.

4. A computer-implemented method for reducing latency in communication over a network, the method, implemented using one or more processors comprising:
    obtaining historical data concerning network communications including latency, inter-message timing, volume and number of sessions;
    converting the obtained data into feature parameters for use as inputs to a machine learning algorithm, wherein the feature parameters include an inter-message timing metric;
    training the machine learning algorithm using the feature parameters to predict round trip latency of communications of the network;
    after training the network, providing new feature parameters concerning a current communication scenario, the new feature parameters including at least an inter-message timing range and a number of sessions;
    executing the trained machine learning algorithm to predict round trip latency based on the new feature parameters;
    determining a predicted minimal round trip latency for the current communication scenario by iteratively executing the machine learning algorithm while adjusting the inter-message timing range and the number of sessions of the current communication scenario; and
    setting the inter-message timing range and session parameters for the current communication scenario at values which provide the predicted minimal round trip latency.

5. The method of claim 4, further comprising optimizing the number of sessions used in the current communication scenario.

6. The method of claim 4, further comprising reducing a number of active sessions if it is determined that current latency is sub-optimal based on the predicted minimal round trip latency.

7. The method of claim 6, further comprising redistributing messages among the number of active sessions after reduction.

8. The method of claim 4, wherein the inter-message timing metric comprises a plurality of inter-message timing ranges.

* * * * *